(12) United States Patent
Fries

(10) Patent No.: US 8,924,066 B2
(45) Date of Patent: Dec. 30, 2014

(54) SYSTEMS AND METHODS FOR DETERMINING ROUTE LOCATION

(71) Applicant: General Electric Company, Schenectady, NY (US)

(72) Inventor: Jeffrey Michael Fries, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/899,821

(22) Filed: May 22, 2013

(65) Prior Publication Data

US 2014/0350767 A1    Nov. 27, 2014

(51) Int. Cl.
*G01C 22/00* (2006.01)
*G06F 17/00* (2006.01)
*B61L 1/02* (2006.01)
*B61L 27/00* (2006.01)

(52) U.S. Cl.
CPC .................................. *B61L 27/0077* (2013.01)
USPC .............................. 701/23; 701/19; 246/125

(58) Field of Classification Search
USPC ................................. 701/19, 22, 23; 246/125
See application file for complete search history.

(56) References Cited

U.S. PATENT DOCUMENTS

| | | | | |
|---|---|---|---|---|
| 5,751,569 | A * | 5/1998 | Metel et al. | 700/3 |
| 6,824,110 | B2 | 11/2004 | Kane | |
| 7,089,093 | B2 * | 8/2006 | Lacote et al. | 701/19 |
| 7,164,975 | B2 * | 1/2007 | Bidaud | 701/19 |
| 7,966,126 | B2 | 6/2011 | Willis | |
| 8,214,091 | B2 * | 7/2012 | Kernwein | 701/19 |
| 8,406,940 | B2 | 3/2013 | Otsubo | |
| 8,699,943 | B2 * | 4/2014 | Kummetz et al. | 455/11.1 |
| 2005/0076716 | A1 * | 4/2005 | Turner | 73/579 |
| 2009/0177344 | A1 | 7/2009 | James | |
| 2010/0258682 | A1 * | 10/2010 | Fries et al. | 246/1 C |
| 2011/0084176 | A1 | 4/2011 | Reichelt | |
| 2013/0062474 | A1 * | 3/2013 | Baldwin et al. | 246/122 R |
| 2013/0270395 | A1 * | 10/2013 | Steffen et al. | 246/125 |
| 2014/0012438 | A1 * | 1/2014 | Shoppa et al. | 701/19 |

FOREIGN PATENT DOCUMENTS

JP      2005212700 A   *   8/2005   ............. B61L 23/16

* cited by examiner

*Primary Examiner* — Thomas G Black
*Assistant Examiner* — Tyler Paige
(74) *Attorney, Agent, or Firm* — GE Global Patent Operation; John A. Kramer

(57) ABSTRACT

A system includes a communication module and a determination module. The communication module is configured to be located onboard a vehicle configured to travel along a route including plural sub-routes. The communication module is configured to receive route occupancy information from an off-board wayside module disposed along the route. The route occupancy information corresponds to a presence or absence of vehicular traffic on each sub-route within a range of a route detection system operably coupled to the wayside module. The determination module is configured to be located onboard the vehicle, and to obtain position information from one or more onboard detection units disposed onboard the vehicle. The determination module is configured to determine a particular sub-route on which the vehicle is disposed using a comparison of the position information obtained from the one or more onboard detection units and the occupancy information received from the off-board wayside module.

20 Claims, 4 Drawing Sheets

SYSTEMS AND METHODS FOR DETERMINING ROUTE LOCATION

FIELD

Embodiments of the subject matter described herein relate to vehicle location systems and methods, and more particularly, to systems and methods for determining a particular sub-route or track upon which a vehicle is traveling.

BACKGROUND

Transportation networks may include multiple general parallel routes or sub-routes (e.g., railroad tracks, highway lanes, or the like) over which vehicles may travel. Further, vehicles may be able to switch from traveling on a given one of the parallel sub-routes to a different of the parallel sub-routes. It may be desirable or necessary for a control system to have knowledge of the particular sub-route upon which a vehicle is traveling.

For example, positive or automatic control systems may be employed in transportation networks. Such control systems may require knowledge of a particular track or sub-route on which a vehicle is traveling to properly control the vehicle based on a status of a switch or crossing, the presence of other vehicles on a given track or sub-route, any dangers or impediments to travel on a given track or sub-route, or the like. As one example, a Positive Train Control (PTC) system may be understood as a system for monitoring and controlling the movement of a rail vehicle such as a train to provide increased safety. A train, for example, may receive information about where the train is allowed to safely travel, with onboard equipment configured to apply the information to control the train or enforce control activities in accordance with the information. For example, a PTC system may force a train to slow or stop based on the condition of a signal, switch, crossing, or the like that the train is approaching.

However, PTC systems may have difficulty in accurately determining or establishing which track a train is on. For example, the centers of adjacent train tracks may be as close as about 14 feet. Global positioning system (GPS), even with corrections, may not provide sufficient accuracy to safely or conclusively determine alone which track a train is on. Location determination systems that may be able to provide sufficient accuracy may require additional positioning devices to augment GPS and may be very expensive or cost prohibitive. Thus, PTC systems may rely on an operator of a train to initially enter a particular track on which the train is located, with the train relying on knowledge of the position of track switches to determine which track the train is on as the train travels. However, the initial manual entry of track location is subject to error and can compromise the safety benefit provided by a PTC system. Further, track identification information may need to be re-entered each time a vehicle cuts into a PTC territory from a territory not covered by a PTC system. Such re-entering may require the vehicle to be located within a portion of a route that has only one track, may require a stop, may require operator input, or the like.

Cab signal systems may be employed in an attempt to identify which track a train is traveling upon. In such systems, a transmitter is utilized to send a signal down the rails of the track, with the signal received by an onboard receiver through magnetic induction into an antenna mounted on the front of the train. Each track could have a unique signal identifying which track is being traveled upon. However, in such systems, a large amount of energy may be required to transmit through the rail for reliable signal to noise ratios for the signal received by the train. Further still, insulated joints are required in each track to electrically isolate the rails from each other and control the flow of current. Thus, such systems may be very expensive or cost prohibitive, and may also compromise the structural integrity of the track.

Radiofrequency identification (RFID) tags may also be employed in an attempt to identify which track a train is traveling upon. In such systems, a passive tag may be placed between rails of each track and pre-programmed with information identifying the particular tracks. An active reader onboard the train may interrogate the tag as the train passes over the tag. However, such RFID tags are exposed to the elements as well as vandalism, reducing reliability as well as increasing maintenance and replacement time and costs. Further, such tags may require batteries which further increase maintenance time and costs.

BRIEF DESCRIPTION

In an embodiment, a system includes a communication module and a determination module. As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hardwired instructions, the software that directs hardware to perform the operations, or a combination thereof.

The communication module is configured to be located onboard a vehicle that is configured to travel along a route. The route includes plural sub-routes. The communication module is configured to receive route occupancy information from an off-board wayside module disposed along the route. The route occupancy information corresponds to a presence or absence of vehicular traffic on each of the sub-routes within a geographic range of a route detection system that is configured to be operably coupled to the wayside module. The determination module is configured to be located onboard the vehicle, and to obtain position information from one or more onboard detection units disposed onboard the vehicle. The determination module is configured to determine a particular sub-route of the plural sub-routes on which the vehicle is disposed using a comparison of the position information obtained using the one or more onboard detection units with the occupancy information received from the off-board wayside module.

In an embodiment, a system includes a wayside module configured to be disposed along a route along which a vehicle is configured to travel. The route includes plural sub-routes, and the wayside module includes an occupancy identification module and a communication module. The occupancy identification module is configured to be operably coupled to a route detection system, and to obtain occupancy information corresponding to a presence or absence of vehicular traffic on each of the sub-routes within a geographic range of the route detection system. The occupancy information includes vehicle occupancy information corresponding to the presence of the vehicle on one of the sub-routes. The communication module is configured to communicatively couple the wayside module to the vehicle, and to transmit the occupancy information to the vehicle.

In an embodiment, a method includes obtaining, at a determination module disposed onboard a vehicle, position information corresponding to a location of the vehicle from one or more detection units disposed onboard the vehicle. The vehicle is configured to travel along a route, with the route including plural sub-routes. The method also includes obtaining, via a communication module disposed onboard the vehicle, route occupancy information from a wayside module disposed along the route. The route occupancy information corresponds to a presence or absence of vehicular traffic on each of the sub-routes within a geographic range of a route detection system configured to be operably coupled to the wayside module. The method further includes determining, onboard the vehicle, a particular sub-route of the plural sub-routes on which the vehicle is disposed using a comparison of the position information obtained from the one or more detection units disposed onboard the vehicle and the route occupancy information obtained via the communication module from the wayside module disposed along the route.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
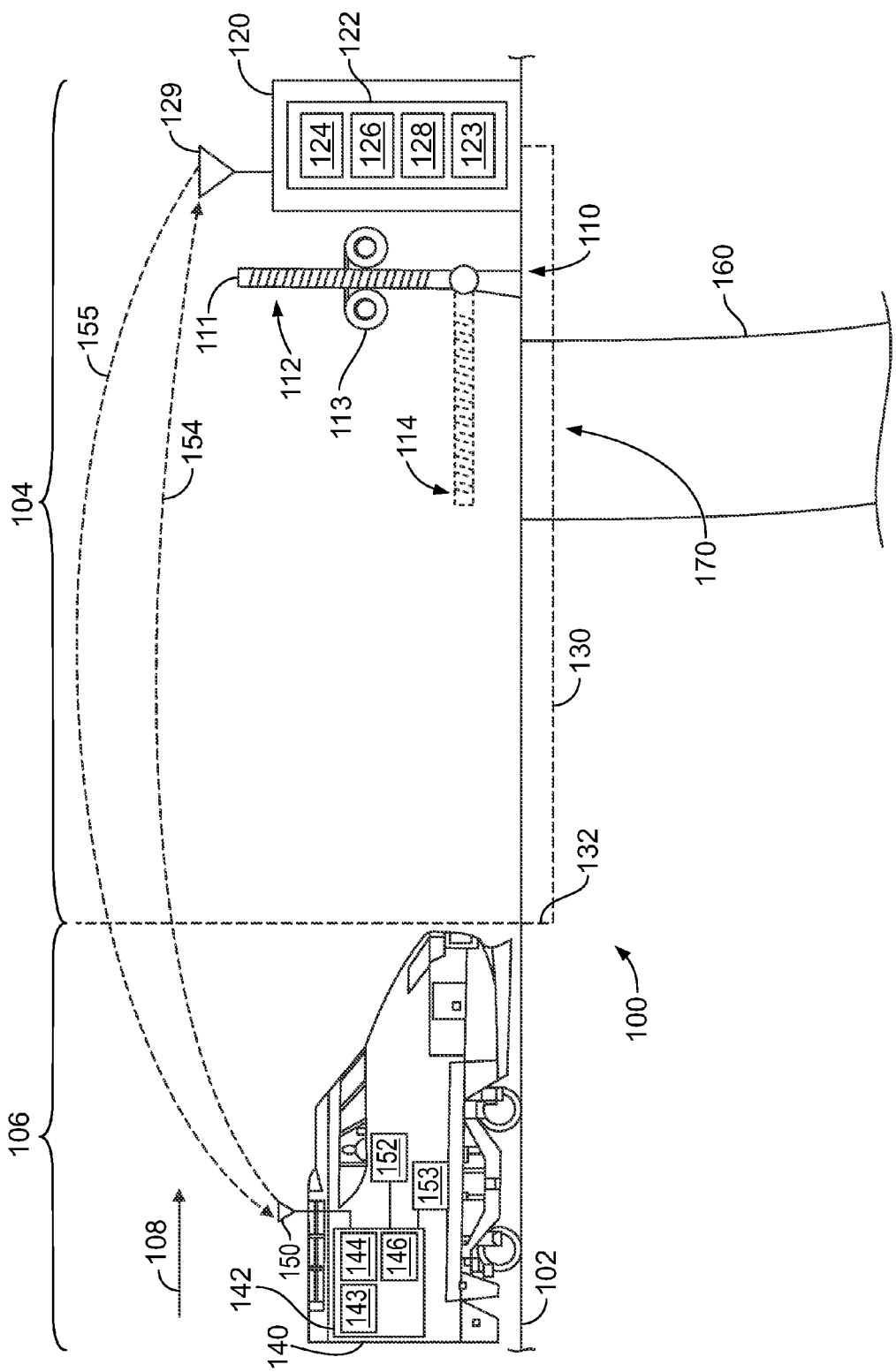
FIG. 1 is a schematic view of a transportation system in accordance with an embodiment.

One or more embodiments of the inventive subject matter described herein provide systems and methods for improved identification of a particular track or sub-route on which a vehicle is traveling, for example in conjunction with a positive control system or other automatic control system associated with the vehicle. In various embodiments, an onboard system is provided that is configured to control movement of a vehicle, such as a rail vehicle, and to communicate with a remote crossing module, such as wayside equipment controlling the crossing. The control systems for the rail vehicle, for example, may be configured to be compatible with Positive Train Control (PTC) systems utilized in the United States. In various embodiments, bidirectional communications between onboard equipment and wayside equipment may be used to identify a particular track or sub-route upon which the vehicle is traveling.

In various embodiments, a route detection system (e.g., a crossing predictor system, occupancy detection system, or the like) may be utilized by wayside equipment to determine occupancy of particular sub-routes monitored by the route detection system. Occupancy information may include one or more of position or velocity information corresponding to each sub-route monitored by the route detection system. The wayside equipment may then communicate the occupancy information to a vehicle (e.g., a rail vehicle) traveling on one of the particular sub-routes, with the vehicle monitoring one or more of the position or velocity of the vehicle using one or more onboard components. The vehicle may then compare the position and/or velocity of the vehicle as determined by the vehicle with the occupancy information obtained using the off-board track detection system. The vehicle may then determine the particular sub-route upon which the vehicle is traveling based on the comparison with the occupancy information for each sub-route. For example, the closest match may be selected.

In various embodiments, the vehicle may request additional occupancy information from the wayside equipment if an initial amount of information was insufficient for the vehicle to safely determine which track the vehicle is traveling on. Additionally or alternatively, the vehicle may be configured to autonomously adjust the control of the vehicle (e.g., increasing throttle, decreasing throttle, applying additional braking, or the like) if an initial or previous amount of occupancy information is not sufficient to safely identify or determine the particular track or sub-route upon which the vehicle travels.

Various embodiments provide for improved identification or determination of a track or sub-route upon which a vehicle is traveling. A technical effect of embodiments includes improved safety regarding track determination for use with a PTC system compared to relying on less safe methods (such as manual user input). A technical effect of embodiments includes more accurate and/or less time consuming determination of a vehicle's position for use with a control system, such as a PTC system. A technical effect of embodiments includes improved safety, for example, by helping prevent collisions caused by lack of accurate knowledge of a vehicle's position. An additional technical effect of embodiments includes reduction of the time and expense for maintenance and/or repair costs for damaged switches and/or other components caused by lack of accurate knowledge of a vehicle's position. An additional technical effect of embodiments includes improved efficiency of a transportation network by reducing unnecessary lockouts or time lost due to trying to establish position of a vehicle among a group of tracks or sub-routes.

Throughout this document, the term "vehicle consist" may be used. A vehicle consist is a group of any number of vehicles that are mechanically coupled to travel together along a route. A vehicle consist may have one or more propulsion-generating units (e.g., vehicles capable of generating propulsive force, which also are referred to as propulsion units) in succession and connected together so as to provide motoring and/or braking capability for the vehicle consist. The propulsion units may be connected together with no other vehicles or cars between the propulsion units. One example of a vehicle consist is a locomotive consist that includes locomotives as the propulsion units. Other vehicles may be used instead of or in addition to locomotives to form the vehicle consist. A vehicle consist may also include non-propulsion generating units, such as where two or more propulsion units are connected with each other by a non-propulsion unit, such as a rail car, passenger car, or other vehicle that cannot generate propulsive force to propel the vehicle consist. A larger vehicle consist, such as a train, may have sub-consists. Specifically, there may be a lead consist (of propulsion or non-powered control units), and one or more remote consists (of propulsion or non-powered control units), such as midway in a line of cars and another remote consist at the end of the train. The vehicle consist may have a lead propulsion unit and a trail or remote propulsion unit. The terms "lead," "trail," and "remote" are used to indicate which of the propulsion units control operations of other propulsion units, and which propulsion units are controlled by other propulsion units, regardless of locations within the vehicle consist. For example, a lead propulsion unit may control the operations of the trail or remote propulsion units, even though the lead propulsion unit may or may not be disposed at a front or leading end of the vehicle consist along a direction of travel. A vehicle consist may be configured for distributed power operation, wherein throttle and braking commands are relayed from the lead propulsion unit to the remote propulsion units by a radio link or physical cable. Toward this end, the term vehicle consist should be not be considered a limiting factor when discussing multiple propulsion units within the same vehicle consist.

FIG. 1 depicts a schematic view of a transportation system 100 in accordance with an embodiment. The system 100 includes a crossing warning system 110, a remote crossing module 120, a track detection system 130, and a vehicle system 140. The remote crossing module 120 provides one example of wayside equipment that may be disposed along a first route 102. It should be noted that other wayside equipment in addition or alternatively to the remote crossing module 120 may be employed in various embodiments. Further, it should be noted that the wayside equipment need not necessarily be associated with a crossing with a second route 160 as depicted in FIG. 1, and that, in various embodiments, the system 100 may not include crossing warning system 110. In the embodiment depicted in FIG. 1, the vehicle system 140 is shown traveling over the first route 102 in a direction 108 toward a crossing 170. The crossing 170 corresponds to intersection of the first route 102 with the second route 160. The first route 102, for example, may be configured as a railroad track over which a rail vehicle may travel. In the illustrated embodiment, the first route 102 may include plural generally parallel sub-routes or tracks, with the vehicle system 140 traveling upon a particular one of the parallel sub-routes or tracks. In FIG. 1, the particular sub-routes are not shown, as FIG. 1 is a side view. The second route 160 in the illustrated embodiment is a road or highway that is paved, leveled, or otherwise configured for automobile and/or truck travel. In some embodiments, the crossing may be understood as a "highway crossing at grade."

The crossing warning system 110 and the remote crossing module 120 are associated with and disposed proximate the crossing 170. The crossing warning system 110 and the remote crossing module 120 are configured to impede or inhibit access through the crossing 170 via the second route 160 (e.g., paved road accessible to automobiles) when the vehicle system 140 passes by or through the crossing 170 along the first route 102 (e.g., rail system).

The track detection system 130 provides one example of a route detection system. The track detection system 130 depicted in FIG. 1 has an effective range 104. In FIG. 1, the vehicle system 140 is depicted in a territory 106 outside of the effective range 104 and moving in direction 108 toward the crossing 170 and toward entering the effective range 104 of the track detection system 130.

It should be noted that FIG. 1 is schematic in nature and intended by way of example. In various embodiments, various aspects or modules may be omitted, modified, or added. Further, various modules, systems, or other aspects may be combined. Yet further still, various modules or systems may be separated into sub-modules or sub-systems and/or functionality of a given module or system may be shared between or assigned differently to different modules or systems.

The depicted crossing warning system 110 is configured to impede or inhibit travel through the crossing 170 along the second route 160 when the crossing warning system 110 is activated. The crossing warning system 110, when activated, may provide one or more of an audible warning (e.g., bell), visible warning (e.g., flashing lights), and/or a physical barrier (e.g., gate). In the illustrated embodiment, the crossing warning system 110 includes a gate 111 that may be raised to an open position 112 to allow traffic through the crossing 170 along the second route 160 or lowered to a closed position 114 to impede traffic through the crossing 170 along the second route 160. In the illustrated embodiment, the crossing warning system 110 also includes warning indicators 113. In various embodiments, the warning indicators 113 may be configured as one or more of lights, bells, or the like. In some embodiments, as used herein, impeding travel along a particular route may not present an absolute bar to travel along the route. For example, travel along a route may be impeded by warning against travel through a crossing, discouraging travel through a crossing, blocking travel through a crossing, instructing against travel through a crossing, or otherwise inhibiting travel through a crossing. For instance, the gate 111 may be placed in the closed position 114 to impede the passage of traffic through the crossing 170 along the second route 160; however, a motorist may attempt to evade the gate 111 by driving around the gate 111. Similarly, a motorist may ignore warning bells or lights. Various embodiments provide improved consistency in warning times to reduce the temptation of motorists to evade or ignore a crossing warning.

The remote crossing module 120 depicted in FIG. 1 provides one example of wayside equipment. In the illustrated embodiment, the remote crossing module 120 is disposed along the route 102 along which the vehicle 140 is configured to travel proximate to the crossing 170. The remote crossing module 120 is operably connected to the crossing warning system 110 and is configured to operate the crossing warning system 110 to allow traffic through the crossing 170 along the second route 160 when no vehicles are traversing through the crossing 170 along the first route 102 (or when no vehicles are within a specified time and/or distance of the crossing 170), and to impede traffic through the crossing 170 along the second route 160 when a vehicle is traversing through the crossing 170 along the first route 102 (or is within a specified time and/or distance of the crossing 170). The remote crossing module 120 may operate the crossing warning system 110 based on instructions or information received from one or more of the vehicle system 140 or the track detection system 130. The remote crossing module 120 depicted in FIG. 1 includes a processing unit 122 and an antenna 129.

The processing unit 122 of the illustrated embodiment includes a communication module 124, an occupancy identification module 126, an automatic closure module 128, and a memory 123. The communication module 124 is configured to receive messages from and/or transmit messages to the vehicle system 140 via the antenna 129. The occupancy identification module 126 is configured to determine route occupancy information corresponding to the presence and/or movement of one or more vehicles (e.g., including the vehicle system 140) along the route 102 within the range 104. The automatic closure module 128 is configured to activate the crossing warning system 110 using information obtained from the track detection system 130. It should be noted that FIG. 1 is intended by way of example and is schematic in nature. In various embodiments, various modules (or portions thereof) of the processing unit 122 may be added, omitted, arranged differently, or joined into a common module, various portions of a module or modules may be separated into other modules or sub-modules and/or be shared with other modules, or the like.

The track detection system 130 is configured to provide information from which the position and/or movement (e.g., velocity) of one or more vehicles on the route 102 may be determined. For example, the route 102 may include a number of generally parallel sub-routes or sets of tracks (see, e.g., FIGS. 2 and 3 and related discussion), with the track detection system 130 detecting the presence and/or movement of any vehicles on the various sub-routes or tracks.

In the illustrated embodiment, the automatic closure module 128 is operably coupled with the track detection system 130. Generally, in various embodiments, the automatic closure module 128 works in conjunction with the track detection system 130. Further, in the illustrated embodiment, the occupancy identification module 126 is operably coupled to the track detection system 130 and receives occupancy information from the track detection system. Again, it should be noted that in various embodiments, wayside equipment may not be associated with a crossing, and the automatic closure module 128 and/or crossing warning system 110 may be omitted.

The depicted automatic closure module 128 is configured to operate the crossing warning system 110 based on information detected through the route 102. The automatic closure module 128, in conjunction with the track detection system 130 may be configured to close a gate or otherwise initiate a warning as a vehicle approaches the crossing 170 along the first route 102 and/or to open a gate or otherwise terminate a warning after a vehicle has passed through the crossing 170 along the first route 102. In some embodiments, the track detection system 130 may be configured as a crossing predictor system that provides information corresponding to both a position along the route 102 and a speed of the vehicle system 140. In some embodiments, the track detection system 130 may be configured as an occupancy detection system that provides information regarding whether the vehicle system 140 is present along a given portion of the route 102 (e.g., within the range 104) or not, without providing information regarding the speed of the vehicle system or the position of the vehicle system 140 along the route 102. In various embodiments, the automatic closure module 128 and/or the occupancy identification module 126 may operate the crossing warning system 110 according to information received from the track detection system 130 as a backup to a different system and/or technique for operating the crossing warning system 110.

As discussed herein, the track detection system 130 (and/or the automatic closure module 128 in conjunction with the track detection system 130) may be configured to send an electrical signal into a track (e.g., route 102) and receive or detect a signal corresponding to an occupancy or activity on the track. As depicted in FIG. 1, the track detection system 130 has a range 104. In the illustrated embodiment, the track detection system 130 includes a detection element 132 that defines the boundary of the range 104. The detection element 132, for example, may be a shunt buried beneath a track and operably connecting adjacent rails for completing or defining a circuit for a signal sent via a crossing predictor system or directing the signal along a track or rail (e.g., route 102). The range 104 corresponds to the distance at which the track detection system is able to detect or determine the presence of the vehicle system 140. In FIG. 1, the range 104 is depicted for ease of illustration as extending in one direction (e.g., to the left of the crossing as seen in FIG. 1), but it should be understood that the range 104 may also extend in the opposite direction (e.g., to the right of the crossing as seen in FIG. 1) to provide for traffic detection in multiple directions.

As indicated above, the track detection system 130 may be configured as a crossing predictor system. Crossing predictors may be used to attempt to determine a time of arrival at a crossing by a vehicle. Crossing predictor systems may use alternating current (AC) track circuits to determine the rate of change of impedance in an area of track near a crossing. The area near the crossing may be referred to as an approach. Such an approach may be hundreds or thousands of feet on either side of a crossing. As a vehicle such as a train moves toward the crossing, the axles of the train act to shunt the AC track circuit signal, shortening the distance that the signal flows through. In various embodiments, the crossing predictor (e.g., one or more portions or aspects of the track detection system 130 and/or automatic determination module 128) may measure a rate of change of the electrical impedance indicated by the signal, and estimates the speed of the train based on the changes in measured electrical impedance over time, and may estimate a predicted arrival time of the vehicle at the crossing based on the determined speed and position, with a crossing warning device activated at a predetermined time interval before the predicted arrival time.

In various embodiments, the crossing predictor provides information describing the occupancy of the various routes to the occupancy identification module 126 and/or the communication module 124 which may in turn be provided to the vehicle system 140. For example, in various embodiments, the crossing predictor applies a low power steady state AC signal to the rails, with the flow of current controlled by placing passive termination shunts (e.g., detection element 132) across the rails. A parameter known as RX may be monitored. The RX parameter represents the percentage of unoccupied track between the wayside equipment and the termination shunts on either side of the wayside equipment. For example, when the track is completely unoccupied, the value of RX is 100. When there is 30% of unoccupied track on either side of the wayside equipment, the value of RX is 30. The value of RX changes linearly as the train moves form the termination shunt towards the wayside equipment. Such crossing predictors utilize less power than a cab signal system, and the passive termination shunts are considerably less expensive to install than insulated joints associated with cab signal systems, and do not require cutting of the rails. Moreover, the wayside equipment (e.g., the remote crossing module 120) may be disposed in a secure housing, and the termination shunts (e.g., detection element 132) may be buried underground, thereby reducing or eliminating exposure to the elements or to vandalism.

In other embodiments, the track detection system 130 may be configured as a type of detection system other than a crossing predictor system. For example, crossing predictor systems do not function properly when a relatively large amount of electrical interference is present, such as electrical interference present in electrified systems. In such electrified systems, vehicles such as trains may be powered by AC or direct current (DC) power provided by an overhead catenary, third rail, or the like. The currents provided to power the vehicles may exceed hundreds or thousands of amperes, and are much larger than currents used by crossing predictor systems. The large difference in signal amplitudes between the electrification currents used to power vehicles and the currents used for crossing predictors may make it difficult to separate the signals. Further, interference frequencies from the electrification currents may, for example, cause activation via crossing predictors when no vehicles are present, leading to confused motorists and/or motorists evading crossing gates or engaging in other unsafe behavior. Also, in such electrification systems, there may be impedance bonds between adjacent rails configured to balance the flow of electrification currents between rails to improve safety by reducing hazardous voltages that may develop between the rails. Such impedance bonds may cause errors in the impedance calculations used by the crossing predictors used to predict arrival time of vehicles at the crossing. As a result, crossing predictors may not be employed in electrified territories.

Instead, electrified systems may employ occupancy detection circuits or systems. Such occupancy detection track circuits may detect the presence of a train or other vehicle along a route within a given distance of a crossing, but may not detect or determine information corresponding to a more precise position and/or speed of a vehicle. For such systems, a warning may be activated (e.g., a crossing gate lowered) once the track detection system 130 detects the presence of the vehicle system 140 within the range 104.

The occupancy identification module 126 is configured to be operably coupled to the track detection system 130, and to obtain occupancy information from the track detection system, with the occupancy information corresponding to a presence or absence of vehicular traffic on each track or sub-route within the range 104 of the track detection system 130. Such information may describe or depict one or more of a presence within a predetermined range, a specific location or position within the predetermined range, a velocity or rate of change of position within the predetermined range, a time of entry into (and/or exit from) a predetermined range, or the like. For example, in embodiments utilizing a crossing predictor system, the occupancy identification module 126 may collect and compile information corresponding to the relative position of any vehicle or vehicles disposed on each sub-route or track at one or more times. As another example, in embodiments utilizing an occupancy detection system, the occupancy identification module 126 may collect and compile information describing whether or not each particular track or sub-route is occupied within the range 104. Further, timing information may be included to identify one or more times at which the information was collected and/or to be utilized in determining a velocity or change of position.

In one example scenario, the track detection system 130 may be configured as part of a crossing predictor system used to monitor 4 sub-routes identified as tracks A, B, C, and D. In the example scenario, the vehicle system 140 may be at a midpoint of the range along track A, with the other tracks unoccupied. Thus, at a given time $t_0$, the occupancy identification module 126 may receive information from the track detection system corresponding to an RX value of 50 for track A and 100 (e.g., 100% unoccupied) for the other tracks. If the RX value of 50 corresponds to the midpoint of the range and if the range is 1000 feet, the occupancy identification module 126 may then compile the information in a format describing the occupancy of the tracks as summarized in the table below. In the table below, location is given as a distance from the crossing 170. In other embodiments, the location may be described in other terms, for example as GPS coordinates that may be determined based on an adjustment from a known position of the crossing using the distance determined using the RX parameter.

| Track | A | B | C | D |
|---|---|---|---|---|
| Location (distance from crossing) | 500 | N/A | N/A | N/A |

In another example scenario, the information may be collected over time. For example, information may be collected at a second time $t_1$. At $t_1$, the vehicle system 140 may have moved to a position corresponding to an RX parameter of 30 (e.g., 30% of 1000 feet, or 300 feet from the crossing 170). Further, a second vehicle may have entered the range at a position corresponding to an RX parameter of 90 on track C (or 900 feet from the crossing 170).

| Track | A | B | C | D |
|---|---|---|---|---|
| Location at $t_0$ | 500 | N/A | N/A | N/A |
| Location at $t_1$ | 300 | N/A | 900 | N/A |

In other embodiments, the track detection system 130 may be configured as an occupancy detection system that does not provide specific location information, but instead provides information corresponding to whether or not a vehicle is disposed on a given sub-route or track. Continuing the example scenario discussed above (where the vehicle system 140 was within the range 104 at both $t_0$ and $t_1$, and where a different vehicle entered the range 104 after $t_0$ but before $t_1$), the information from such a detection system may be summarized in the table below.

| Track | A | B | C | D |
|---|---|---|---|---|
| Occupied at $t_0$? | Yes | No | No | No |
| Occupied at $t_1$? | Yes | No | Yes | No |

Generally, the occupancy information may be compiled and formatted by the remote crossing module 120 (e.g., by the communication module 124 and/or the occupancy identification module 126) and transmitted to the vehicle system 140. The vehicle system 140, as discussed herein, may then compare the occupancy information provided by the remote crossing module 120 with information obtained by the vehicle system 140 corresponding to the position and/or velocity of the vehicle system 140 to determine which particular sub-route the vehicle system 140 is disposed upon.

In various embodiments, information from a crossing predictor system may be collected and/or provided to the vehicle system 140 in a variety of ways. As one example, the occupancy identification module 126 may receive information from the track detection system 130 over time, determine a position at each given time and determine a velocity based on a change in RX parameter. Further, the velocity and position information may be collected for each track or sub-route, and a message describing the position and velocity of any vehicles on each track or sub-route then forwarded to the vehicle system 140 via the antenna 129.

As another example, the occupancy identification module 126 may collect information describing the position of any vehicles on each track at a number of times (e.g., at predetermined intervals) and forward the information to the vehicle system 140. In some embodiments, the information may be sent for various times as a single message, while in other embodiments the information corresponding to each time of collection of information may be sent separately. The vehicle system 140 may then use the position information from different times to determine the velocity of any vehicles present on the tracks or sub-routes.

As one more example, the occupancy identification module 126 may collect occupancy information from the track detection system 130 at a single instance in time and forward the information to the vehicle system 140. Then, if the vehicle system 140 requests additional information at a different time or times, the wayside determination module may forward the additional information responsive to such a request. The vehicle system 140 may then compare a position and/or velocity of the vehicle system 140 as determined internally by the vehicle system 140 to the occupancy information for each particular track or sub-route at one or more times, and determine that the vehicle system 140 is disposed on the particular sub-route that provides the best match.

The communication module 124 is configured to communicate messages or information with the vehicle system 140. The communication module 124 may be configured to one or more of receive messages, transmit messages, pre-process information or data received in a message, format information or data to form a message, decode a message, decrypt or encrypt a message, compile information to form a message, extract information from a message, or the like. In the illustrated embodiment, the communication module 124 utilizes the antenna 129 to communicate wirelessly with the vehicle system 140. For example, the communication module 124 may receive a message 154 via the antenna 129 transmitted from the vehicle system 140, and/or may transmit a message 155 via the antenna 129 to the vehicle system 140.

The message 155 transmitted from the remote crossing module 120 to the vehicle system 140 may include, for example, route occupancy information corresponding to the presence, absence, and/or movement of one or more vehicles along the tracks or sub-routes of the route 102 at one or more times. For example, the message may include the RX parameter for each track of the route 102 in a prescribed or predetermined order with in the message. For instance, if tracks A, B, C, and D are sub-routes of the route 102, the message may provide the RX parameter for track A, followed by the RX parameter for track B, followed by the RX parameter for track C, followed by the RX parameter for track D. Onboard equipment (e.g., the sub-route determination module 144 and/or the communication module 146) of the vehicle system 140 may then utilize the order of the provided RX parameters to determine occupancy for each of the particular tracks or sub-routes at a given territory or area. For example, the onboard equipment may be configured to identify tracks by name or other identifier using information describing the tracks in a preloaded database for example. In some embodiments, the route occupancy information may be provided to the vehicle system 140 in a single message. In other embodiments, the route occupancy information may be transmitted periodically to the vehicle system 140. In still other embodiments, the route occupancy information may be transmitted responsive to requests from the vehicle system. In addition to the route occupancy information, the message 155 may include a general GPS location for the crossing that may be utilized by the vehicle system in determining the location of the vehicle(s) identified by the route occupancy information. For example, the message 155 may include a GPS location corresponding to the crossing, and the vehicle system 140 may determine GPS locations for any vehicles identified by the route occupancy information based on the distance of any such vehicles from the known GPS location of the crossing. The vehicle system 140 may then compare the identified GPS location of the vehicles with an independently determined GPS location for the vehicle system 140 to identify the route on which the vehicle system 140 is disposed. As another example, the vehicle system 140 may determine a distance for the vehicle system 140 from the crossing by comparing a previously determined GPS location for the vehicle system 140 with the provided GPS location for the crossing. The determined distance of the vehicle system 140 from the crossing may then be compared to differences provided in the route occupancy information to determine with track the vehicle system 140 is disposed on.

The message 154 transmitted from the vehicle system 140 to the remote crossing module 120 may include a wakeup request. For example, the remote crossing module 120 and/or the track detection system 130 may be placed in a sleep mode to conserve power. As the vehicle system 140 approaches the crossing 170 and nears the range 104 of the track detection system 130, the vehicle system 140 may send the message 154 including a wakeup command to the remote crossing module 120 to remove the remote crossing module 120 and/or the track detection system 130 from the sleep mode. After exiting the sleep mode, the track detection system 130 may begin applying a steady state AC signal to each track and begin measuring the RX parameter for each track.

In various embodiments, the message 154 may include a request for additional track occupancy information. For example, if a first group of track occupancy information is not sufficient for the vehicle system to determine a track being traveled upon, the vehicle system 140 may transmit a request for additional information to the remote crossing module 120. For example, if two tracks show a vehicle at about the same position at a first time, and the route occupancy information for only the first time is transmitted to the vehicle system 140, the vehicle system 140 may not be able to determine which of the two tracks the vehicle system 140 is disposed on. However, if one of the vehicles is moving (or the vehicles are moving at different rates), then route occupancy information for the tracks in question from subsequent times may differ significantly enough for the vehicle system 140 to distinguish between the tracks and determine which track the vehicle system 140 is traveling upon. In various embodiments, the message 154 may include additional information corresponding to the operation of the vehicle system 140 (e.g., information corresponding to upcoming changes in speed, stops before the crossing 170, or the like).

In various embodiments, one or more of the message 154 or the message 155 may include timing information that is configured as an absolute time. An absolute time may be understood as a time specified in accordance with a synchronization scheme where other entities use the same scheme. For example, clocks associated with and/or accessible by both the vehicle system 140 and the remote crossing module 120 may be synchronized via a common precision time reference such as a time provided by a global positioning system (GPS) or Network Time Protocol (NTP).

Further, for example after the specific track on which the vehicle system 140 is traveling has been determined, in various embodiments, information regarding track occupancy, status of switches, or other information utilized, for example, in conjunction with a positive control system, may be exchanged between the remote crossing module 120 and the vehicle system 140 (e.g. as part of one or more of the message 154 or the message 155). A positive train control system may be understood as a system for monitoring and controlling the movement of a rail vehicle such as a train to provide increased safety. A train, for example, may receive information about where the train is allowed to safely travel, with onboard equipment configured to apply the information to control the train or enforce control activities in accordance with the information. For example, a positive train control system may force a train to slow or stop based on the condition of a signal, switch, crossing, or the like that the train is approaching.

The vehicle system 140 is configured to travel along the first route 102. In FIG. 1, the vehicle system 140 is positioned in the territory 106 outside of the range 104 of the track detection system 130, and is traveling in a direction 108 toward the crossing 170. The vehicle system 140 may be, for example, a rail vehicle. In the illustrated embodiment, the vehicle system 140 is depicted as a locomotive; however, the vehicle system 140 may be configured otherwise in other embodiments, for example as a rail vehicle consist, or, as another example, as a non-rail vehicle. In some embodiments, the vehicle system 140 may include an internal source, such as a diesel powered generating unit and/or battery, for providing motive force. In some embodiments, the vehicle system 140 may receive energy for providing motive force from an external power source disposed along the route 102, such as a third rail or overhead catenary. The vehicle system 140 depicted in FIG. 1 includes a processing unit 142, an antenna 150, a position detection module 152, and an automatic control module 153.

The processing unit 142 is configured to be disposed onboard the vehicle system 140, and includes a memory 143, a sub-route determination module 144, and a communication module 146. It should be noted that FIG. 1 is intended by way of example and is schematic in nature. In various embodiments, various modules (or portions thereof) of the processing unit 142 may be added, omitted, arranged differently, or joined into a common module, various portions of a module or modules may be separated into other modules or sub-modules and/or be shared with other modules, or the like.

In the illustrated embodiment, the sub-route determination module 144 is configured to obtain position information from one or more detection units disposed onboard the vehicle system 140. In the illustrated embodiments, the sub-route determination module 144 obtains position information from the position detection module 152. The sub-route determination module 144 is further configured to determine the particular sub-route or track upon which the vehicle system 140 is disposed or is traveling using a comparison of the position information (the information obtained onboard the vehicle system 140 using the position detection module 152) and the route occupancy information (the information obtained using the track detection system 130 and transmitted from the remote crossing module 120 to the vehicle system 140). In various embodiments, the position information may include vehicle location information that corresponds to a location of the vehicle determined using the position detection module 152, and/or may include vehicle velocity information corresponding to a velocity of the vehicle system 140 determined using the position detection module 152.

Generally, the sub-route determination module 144 is configured to obtain position information from the position detection module 152 and to obtain route occupancy information from the remote crossing module 120 (e.g., via the communication module 146 and the antennas, 150, 129). The sub-route determination module 144 then compares the position information and the route occupancy information to identify the particular track or sub-route that has occupancy information most closely corresponding to the position information. The sub-route identified as having occupancy information that most closely corresponds to the position information may be determined by the sub-route determination module 144 to be the particular sub-route upon which the vehicle system 140 is traveling.

For instance, in one example scenario, the route 102 includes four sub-routes configured as tracks A, B, C, and D. In the example scenario, the vehicle system 140 obtains position information corresponding to a position 500 feet away from the crossing 170. For example, a GPS position of the vehicle system 140 obtained using the position detector 152 may be compared to the location of the crossing 170 (e.g., as stored in a database onboard the vehicle system 140 and/or received from the remote crossing module 120) to provide the location of the vehicle system 140 relative to the crossing 170.

Next, the position information (e.g., 500 feet from the crossing 170) may be compared to route occupancy information describing the position of one or more vehicles as determined by the remote crossing module 120. For instance, the route occupancy information in the example scenario may be summarized as follows:

| Track | A | B | C | D |
|---|---|---|---|---|
| Location (distance from crossing) | 500 | N/A | N/A | N/A |

In the example scenario, the position information (e.g., 500 feet from the crossing) most closely resembles the occupancy information for Track A. Accordingly, the sub-route determination module 144 may determine that the vehicle system 140 is traveling upon Track A. The sub-route determination module 144 may then provide the identification of Track A to a PTC system associated with the vehicle system 140, which may use the track identification information to set the track (or confirm or correct a previously entered track) for use in controlling the vehicle system 140 in PTC territories. In various embodiments, a margin of error may be applied to identify the particular sub-route on which the vehicle system 140 is traveling. If an initial amount of information is not sufficient to identify the track, additional information may be requested and/or provided. For example if two or more tracks at a first time have occupancy information within the margin of error of the position determined onboard the vehicle system 140 (e.g., two or more tracks indicate a vehicle position of 500 feet within a margin of error in the above example), information at subsequent times may be used to distinguish the tracks.

Additionally or alternatively, a velocity may be used to determine or identify the track or sub-route. For example, if the vehicle system 140 is traveling at a velocity of about 20 miles per hour (approximately 32 kilometers per hour), and if a first track is indicated by a track detection system 130 as having a stationary vehicle at an indicated location corresponding to the location as determined by the vehicle system 140, while a second track is indicated by a track detection system 130 as having a vehicle traveling about 20 miles per hour at the indicated location and in the same direction as the vehicle system 140, the sub-route determination module 144 may determine that the vehicle system 140 is traveling on the second track. In some embodiments, velocity information corresponding to information collected by a track detection system may be determined by the remote crossing module 120 and transmitted to the vehicle system 140, while, in other embodiments, the remote crossing module 120 may transmit location information over a time span and the vehicle system 140 (e.g., on onboard processing unit of the vehicle system 140) may determine velocity information using the location information over the time span.

Further, additionally or alternatively, a time at which a vehicle enters or leaves a range may be utilized. For example, in one example scenario, occupancy information for a first track indicates the presence of a vehicle for the entirety of a given time span, and occupancy information for a second track indicates the presence of a vehicle for a portion of the time span less than the entirety of the time span. If the vehicle system 140 determines internally that the vehicle system 140 has been within range of the track detection system 130 for the entirety of the time span, then the sub-route determination module 144 may determine that the vehicle system 140 is on the first track. As another example, the sub-route determination module 144 may determine the time at which the vehicle system 140 enters the range 104, and analyze the occupancy information describing the occupancy of the various sub-routes to identify a particular sub-route that first became occupied at or around the time the vehicle system 140 entered the range 104.

Further still, in various embodiments, if the occupancy information provided by the remote crossing module 120 is not sufficient to determine the particular track, the sub-route determination module 144 may request or command an automatic control system (e.g., automatic control system 153) to alter the operation of the vehicle system 140 to help distinguish the sub-routes or tracks. For example, if vehicles are stationary and positioned on tracks at a similar distance from the crossing 170, the automatic control system 153 may control the vehicle system 140 to move a given amount to distinguish between the tracks. As another example, if two vehicles on different tracks are at a similar distance from the crossing 170 and travelling at a similar velocity, the automatic control system 153 may increase (or decrease) the speed of the vehicle system 140 to help distinguish which track the vehicle system 140 is traveling upon.

As indicated above, the position detection module 152 is used to sense or detect the position of the vehicle system 140 (and/or information corresponding to the position of the vehicle system 140). The position detection module 152 may include one or more detectors or sensors. The position detection module 152, for example, may include one or more of a GPS detector, RFID detector, speedometer, axle tachometer, or the like. For example, in various embodiments, the position detection module 152 may include a GPS detector to provide a general position of the vehicle system 140 at one or more times. Further, the velocity of the vehicle may be determined from GPS information collected at different times and/or using information from an axle tachometer. Further still, for example, if the vehicle system 140 moves out of range or communication with a GPS system, the sub-route determination module 144 may use previously known location information modified by a known speed (e.g., determined using an axle tachometer) and the time elapsed to determine a current position of the vehicle system 140. The position detection module 152 may also be configured to provide an absolute time reference to the processing module 142.

The position of the crossing 170 (as well as the position of any vehicles that are described as being a given distance from the crossing 170) and/or the range 104 may be determined in various embodiments from one or more of information stored in a database (e.g., a database tabulating positions of crossings along with ranges of track detection systems associated with corresponding crossings), information from a trip plan (e.g., information specifying which particular stations will be stopped at), information from the remote crossing module 120 or other wayside equipment (e.g., a message from the remote crossing module 120 identifying or specifying one or more of the range 104 of the track detection system 130, the position of the crossing 170, the position of the remote crossing module 120, or the like.

The communication module 146 is configured to communicatively couple the vehicle system (e.g., the sub-route determination module 144) to the remote crossing module 120. In the illustrated embodiment, the communication module 146 is wirelessly communicatively coupled to the remote crossing module via the antenna 150 (and the antenna 129 of the remote crossing module 120). For example, the communication module 146 may transmit the message 154 (via the antenna 150) to the communication module 124 of the remote crossing module 120 (via the antenna 129) and/or receive the message 155 from the communication module 124 of the remote crossing module 120.

The communication module 146 may be configured to one or more of receive messages (e.g., messages from the remote crossing module 120), transmit messages, pre-process information or data received in a message, format information or data to form a message, decode a message, decrypt or encrypt a message, compile information to form a message, extract information from a message, or the like. For example, the communication module 146 may be configured to use information from the sub-route determination module 144 to construct the message 154. Various requests or types of information may be sent together as one message, or, as another example, may be sent as parts of separate messages.

Further still, in various embodiments, the communication module 146 may be configured to transmit the position information obtained from the position detection module 152 to the remote crossing module 120. The occupancy identification module 126 may then compare the position information to the route occupancy information and determine which particular track or sub-route the vehicle system 140 is traveling upon. Then, the remote crossing module 120 may transmit a message identifying the track upon which the vehicle system 140 is traveling to the communication module 146 of the vehicle system 140.

The control module 153 in the illustrated embodiment is configured to control operation of the vehicle system 140, for example, to override an operator input, a control action called for by a trip plan, or the like. For example, the control module 153 may increase the speed of the vehicle system 140, decrease the speed of the vehicle system 140, stop the vehicle system 140, or start the vehicle system 140 in motion responsive to a prompt from the sub-route determination module 144 to help distinguish which track the vehicle system 140 is traveling upon. For example, if the vehicle system 140 is traveling on a first track at a given speed and a different vehicle system is traveling on a second track at a similar location and at a similar speed, the sub-route determination module 144 may be unable to safely determine which of the first and second tracks is occupied by the vehicle system 140. Accordingly, in various embodiments, the control module 153 may bring the vehicle system 140 to a stop, or slow the vehicle system down, to help distinguish which track the vehicle system 140 is traveling upon.

The control module 153 may be configured to perform additional control tasks, for example, control tasks that are performed autonomously without operator interference and/or are configured to override or ignore any inconsistent operator inputs. For example, in various embodiments, the control module 153 may be configured to receive positive train control (PTC) signals from wayside equipment and to control the vehicle system 140 accordingly.

Figure 2:
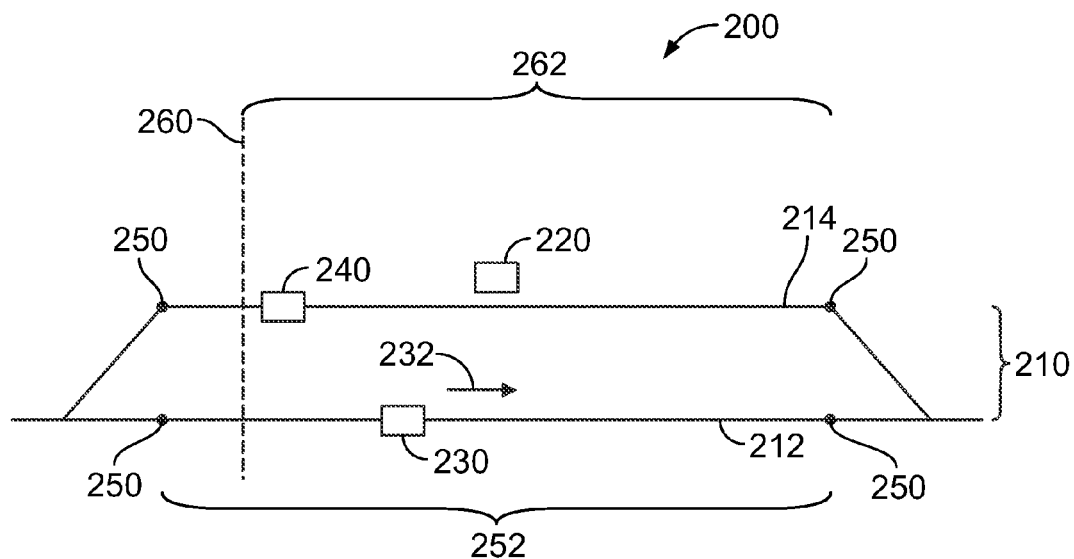
FIG. 2 is a schematic diagram of a transportation network in accordance with an embodiment.

FIG. 2 provides an overhead schematic diagram of an embodiment of a transportation network 200 formed in accordance with an embodiment. The transportation network 200 is configured to utilize information communicated between one or more vehicle systems and a wayside module to determine which of a plurality of sub-routes or tracks a given vehicle is disposed upon. The transportation network 200 includes a route 210 that includes generally parallel sub-routes 212 and 214 over a length of the route 210. At other portions (e.g., to the far left and to the far right as shown in FIG. 2) along the length of route 210, the route 210 may be configured as a single route. In the illustrated embodiment, each sub-route may be configured as a pair of tracks or rails configured for travel by a rail vehicle. In FIG. 2, a first rail vehicle 230 traverses the track 212 in a direction 232, and a second rail vehicle 240 is stationary on the track 214. The rail vehicles 230, 240 may each be configured as, for example, a rail vehicle consist or another vehicle capable of self-propulsion. In various embodiments, the rail vehicles 230, 240 may receive power from a power source (not shown) disposed along the first route 210, such as a third rail or overhead catenary. The transportation network 200 further includes a wayside module 220 disposed along the route 210. In various embodiments, the wayside module 220 may be configured as a remote crossing module configured to operate a crossing warning system. In the illustrated embodiments, the wayside module 220 includes a crossing predictor system associated therewith including termination shunts 250 that define a range 252. Further, the rail vehicles 230, 240 are configured for use with a PTC system.

In the illustrated embodiment, the transportation network includes a PTC territory 262 having a cut in/cut out boundary at 260. The boundary 260 defines the area or territory in which the PTC system becomes active. For example, in the illustrated embodiment, PTC commands are not utilized outside of the territory 262 (e.g., to the left of the boundary 260 as shown in FIG. 2), and the particular track on which a vehicle is disposed is not tracked outside of PTC territory. Hence, because the route 210 is split into sub-routes 212, 214 at the boundary 260, the particular route on which vehicles are disposed as the vehicles cross the boundary 260 is not known.

Figure 3:
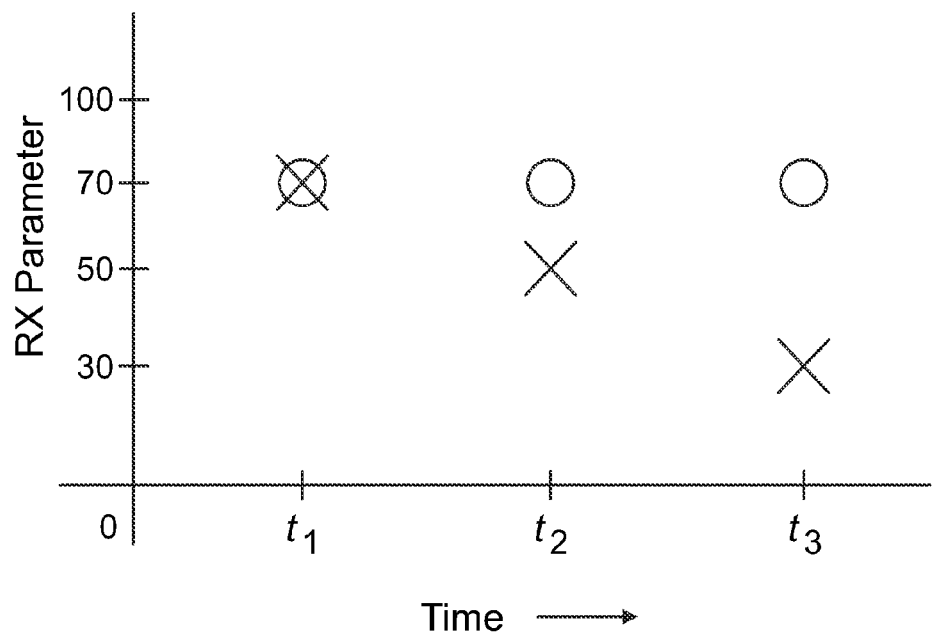
FIG. 3 illustrates values of RX parameters for two vehicle systems in accordance with an embodiment.

FIG. 3 illustrates route occupancy information (e.g., values of RX parameters for two vehicle systems at various times) that may be collected by the wayside module 220, transmitted to the rail vehicle 230, and utilized by the rail vehicle 230 to determine the track upon which the rail vehicle 230 is disposed. Again, as discussed above, in the illustrated embodiment, the rail vehicle 230 is traveling in the direction 232 along track 212 while the rail vehicle 240 is stationary on track 214.

The wayside module 220 may use a crossing predictor system having the range 252 to collect route occupancy information describing the occupancy of the tracks 212, 214 of the route 210 at various times. In the illustrated embodiment, occupancy information is collected at three times: $t_1$, $t_2$, and $t_3$. In FIG. 2, the vertical axis is shown as displaying values of the RX parameter, but may display location (e.g., distance from the wayside module 220) in other embodiments. The RX parameter for the track 214 is shown with an "O" for each time, and the RX parameter for the track 212 is shown with an "X" for each time. The RX parameter for the track 214 remains constant at 70 for each time, as the vehicle disposed upon the track 214 (the vehicle 240) is stationary. However, the RX parameter for the track 212 varies over time, as the rail vehicle 230 is moving towards the wayside module in the direction 232.

Before the rail vehicle 230 enters the range 252 (and the territory 262), the rail vehicle 230 may send a wakeup message to the wayside module 220. In the illustrated embodiment, the wayside module 220 activates a crossing predictor system responsive to the wakeup message and begins collecting route occupancy information (as summarized in FIG. 3). After collecting the route occupancy information, the wayside module 220 transmits the route occupancy information to the rail vehicle 230. The rail vehicle 230 may then compare position information determined onboard the rail vehicle 230 using one or more sensors or detectors located onboard the rail vehicle 230 to determine which track the rail vehicle 230 is disposed upon.

For example, the rail vehicle 230 may determine, using an onboard detector such as a GPS detector, that the rail vehicle 230 was located at a first location that also corresponds to a location indicated by an RX parameter of 70 at time $t_1$. Because the route occupancy information indicates an RX parameter of 70 at time $t_1$ for both tracks 212, 214, the route occupancy information for time $t_1$ is not sufficient to determine which track the rail vehicle 230 is disposed upon. However, the rail vehicle may determine that the rail vehicle 230 was located at a second location that corresponds to a location indicated by an RX parameter of 50 at time $t_2$, and at a third location that corresponds to a location indicated by an RX parameter of 30 at time $t_3$. Thus, the rail vehicle 230 may determine that the rail vehicle 230 is disposed on the track 212 using the route occupancy information from time $t_2$ and/or time $t_3$. Alternatively or additionally, the rail vehicle 230 may use velocity information at one or more times to distinguish which track the rail vehicle 230 is disposed upon, as only the rail vehicle 230 is moving in the depicted embodiment. Further still, in various embodiments, the track determination may be aided by operator input. For example, if the rail vehicle 230 is unable to distinguish which track the rail vehicle 230 is on due to the presence of another vehicle, the rail vehicle 230 may prompt an operator to describe a relative position of the vehicles (e.g., a direction of one vehicle relative to one or more other vehicles based on compass coordinates, relative to a direction of travel, or the like), and may use the relative position of the vehicles in addition to the route occupancy information to determine the particular track upon which the rail vehicle 230 is traveling.

Figure 4:
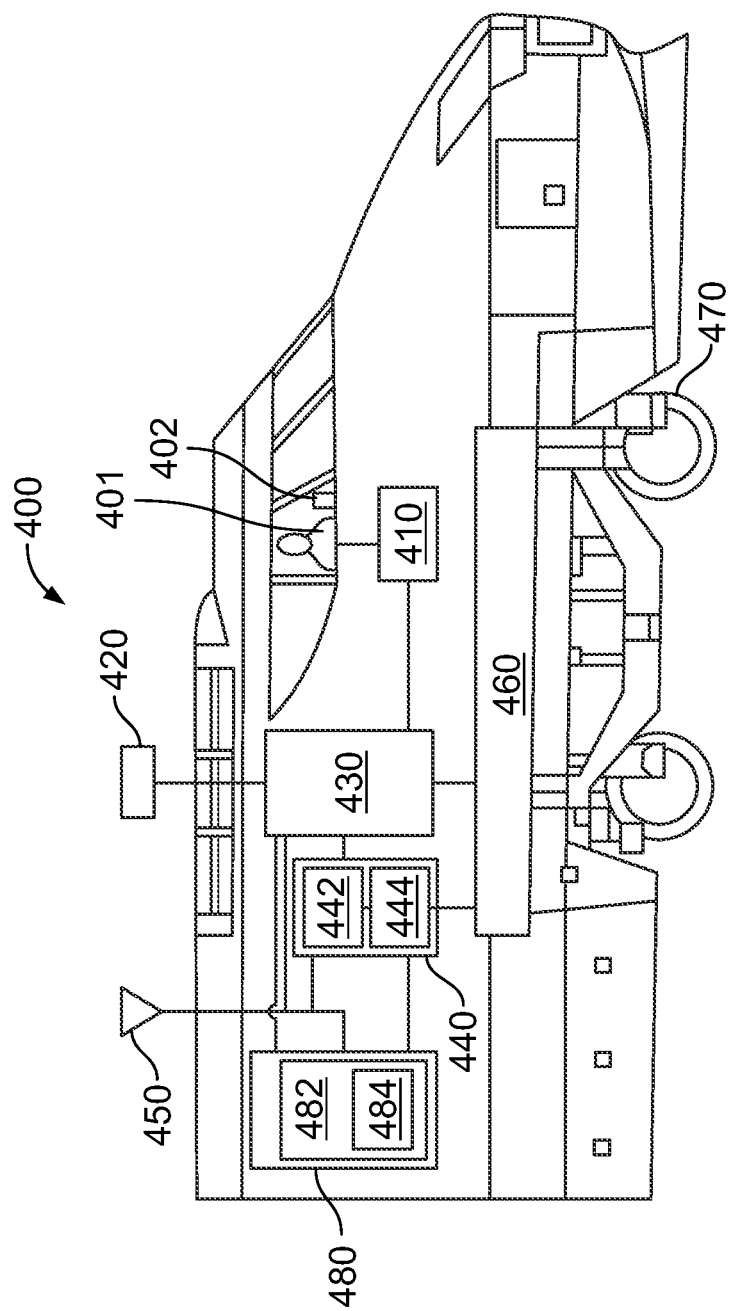
FIG. 4 is a schematic view of a vehicle system in accordance with an embodiment.

FIG. 4 provides a schematic view of a vehicle system 400 formed in accordance with an embodiment. The vehicle system 400 may include, for example, a rail vehicle consist including rail vehicle units (e.g., locomotives and non-powered units). The vehicle system 400 of the illustrated embodiment includes a display module 402, a manual input module 410, an automatic input module 420, an automatic control module 430, a trip planning control module 440, an antenna 450, a propulsion system 460, wheels 470, and a route determination module 480. Generally speaking, in the depicted embodiment, the trip planning control module 440 is configured to plan a trip and to provide control messages, either to an operator and/or directly to the propulsion system 460, to propel the vehicle system 400 along a trip or mission. The propulsion system 460 may include one or more motors and one or more brakes, with the control messages configured to cause the propulsion system to engage in braking or motoring activities in accordance with a trip plan. The automatic control system 430 may be configured to operate in accordance with a PTC system. In the illustrated embodiment, the automatic control system 430 is configured to override the trip planning control module 440 and/or an operator control, for example, to stop or slow the vehicle system 400 in accordance with a rule, for example a speed limit, or a safety condition such as a lockout or circumstance where another vehicle occupies a segment of a route the vehicle system 400 would otherwise enter pursuant to a command by the trip planning control module 440 and/or operator control. The antenna 450 is configured for communication between the vehicle system 400 and one or more off-board systems, such as, for example, wayside stations (e.g., remote crossing module 120, wayside module 220) and/or central scheduling systems and/or other vehicles traversing a transportation network. The rail vehicle system 400 is depicted as a single powered rail vehicle unit for ease of depiction. Other vehicle systems, including rail vehicle consists, may be employed in other embodiments.

The display module 402 is configured to provide information to an operator 401, and the manual input module 410 is configured to receive information from the operator 401. The display module 402 may include one or more of a screen, lights, speaker, bell, or the like configured to convey information to an operator. The display module 402 may provide an operator with prompts. For example, in various embodiments, if the route determination module 480 is unable to distinguish between two tracks due to generally similar position and/or velocity of vehicles on each of the tracks, the operator may be provided with a prompt via the display module 402 to provide information to help distinguish the vehicles or tracks, and/or to alter the operation (e.g., increase speed, decrease speed) of the vehicle system 400 to help distinguish the vehicles and tracks.

The manual input module 410 is configured to obtain manually input information including manually input location information. The manually input location information may be used alone or in conjunction with automatically input location information by the route determination module 480 to determine track identification information for the rail vehicle system 400. The manually input information may correspond to information obtained via operator observation from one or more sources. For example, the manually input information may be obtained from a sign or other object configured to convey position information and mounted, hung, or otherwise disposed proximate to a track or route. The manually input information may also include, for example, a relative position of the vehicle system 400 with respect to another vehicle, sign, or landmark, a direction of travel of one or more vehicles, or the like.

The automatic input module 420 is configured to automatically obtain (e.g., without operator intervention) location information and/or timing information. The automatically obtained information may correspond to a location along a track or route (e.g., information from a GPS detector giving a geographic position or identifying a segment of a track or route where the vehicle system 400 is located); and/or a direction (e.g. information from a GPS detector taken at different times with the vehicle system 400 in motion used to determine a trend or direction). The automatic input module 420 in the illustrated embodiment may also provide absolute time information to be utilized, for example, by the route determination module 480 and/or the automatic control system 430. In various embodiments, the automatic input module 420 may obtain position information describing, depicting, or corresponding to a location and/or velocity of the vehicle system 400 that is provided to the route determination module 480, which may determine the track upon which the vehicle system 400 is traveling based on a comparison of the position information with route occupancy information provided by wayside equipment associated with a track detection system. The automatic input module 420 may include one or more of a GPS detector, an axle tachometer, inertial system, LORAN system, or the like. Further, the automatic input module 420 may include a receiver configured to receive location information from a transponder associated with a track or route on which the vehicle system 400 is disposed, for example a transponder associated with a wayside station, a switch, and/or a signal. For example, a message associated with a switch may provide information regarding a change from one track or route to another due to a position of the switch, or may include information corresponding to a vehicle's position along a route or track based on the location of the wayside station. The automatic detection module 420 in various embodiments thus may detect information corresponding to the position of the vehicle system 400 along the length of a given route and/or a particular sub-route on which the vehicle system 400 is traveling.

In the illustrated embodiment, the automatic control module 430 is configured to control the vehicle system 400 to conform to a set of regulations along a route during a trip or mission performed by the vehicle system 400. The automatic control module 430 may be configured to control the vehicle system 400 pursuant to a PTC system. The regulations may be location-based regulations. The regulations may be based on a rule or requirement of operation for a particular route segment, such as a speed limit or the like. The regulations may also correspond to a condition of a track or related componentry, such as if a route segment is occupied by a different vehicle, if a switch is misaligned, or the like. The automatic control module 430 may use location information as determined by the route determination module 480 (e.g., identification of a particular track) as well as information provided by the manual input module 410 and/or the automatic input module 420 (e.g., location along the particular track) to determine appropriate automatic control activities. The automatic control module 430, when enabled, may override or interrupt a previously planned controlled activity (e.g., a control activity previously determined by the trip planning control module 440) and/or an operator controlled activity.

Further, in the illustrated embodiment, the automatic control module 430 is configured to control the vehicle system 400 as appropriate to assist in determining which particular track upon which the vehicle system 400 is traveling. For example, the automatic control module 430 may be configured to adjust the speed of the vehicle system 400 to help distinguish the vehicle system 400 from another vehicle system that may be traveling within a common range of a track detection system.

The trip planning control module 440 of the vehicle system 400 may be configured to receive a schedule sent by an off-board scheduling system. The trip planning control module 440 may include a controller, such as a computer processor or other logic-based device that performs operations based on one or more sets of instructions (e.g., software). The instructions on which the controller operates may be stored on a tangible and non-transitory (e.g., not a transient signal) computer readable storage medium, such as a memory 444. The memory 444 may include one or more computer hard drives, flash drives, RAM, ROM, EEPROM, and the like. Alternatively, one or more of the sets of instructions that direct operations of the controller may be hard-wired into the logic of the controller, such as by being hard-wired logic formed in the hardware of the controller.

The trip planning control module 440 may include one or more modules that perform various operations. The control module 442, along with other modules (not shown) may be included in the controller. The modules may include hardware and/or software systems that operate to perform one or more functions, such as the controller and one or more sets of instructions. Alternatively, one or more of the modules may include a controller that is separate from the controller, or may be combined to form a combined module.

The trip planning control module 440 may receive a schedule from a scheduling system. The schedule may include, among other things, an identification of wayside equipment to be passed during the mission, along with locations of the wayside equipment and/or ranges of track detection equipment associated with the wayside equipment.

In the illustrated embodiment, the control module 442 receives the schedule sent from the scheduling system and generates a trip plan based on the schedule. The trip plan may include throttle settings, brake settings, designated speeds, or the like, of the vehicle system 400 for various sections of a scheduled trip or mission of the vehicle system 400 to the scheduled destination location.

In order to generate the trip plan for the vehicle system 400, the control module 442 can refer to a trip profile that includes information related to the vehicle system 400, information related to a route over which the vehicle system 400 travels to arrive at the scheduled destination, and/or other information related to travel of the vehicle system 400 to the scheduled destination location at the scheduled arrival time. The information related to the vehicle system 400 may include information regarding the fuel efficiency of the vehicle system 400 (e.g., how much fuel is consumed by the vehicle system 400 to traverse different sections of a route), the tractive power (e.g., horsepower) of the vehicle system 400, the weight or mass of the vehicle system 400 and/or cargo, the length and/or other size of the vehicle system 400, the location of powered units in the vehicle system 400, or other information. The information related to the route to be traversed by the vehicle system 400 can include the shape (e.g., curvature), incline, decline, and the like, of various sections of the route, the existence and/or location of known slow orders or damaged sections of the route, and the like.

The trip plan is formulated by the control module 442 based on the trip profile. For example, if the trip profile requires the vehicle system 400 to traverse a steep incline and the trip profile indicates that the vehicle system 400 is carrying significantly heavy cargo, then the control module 442 may form a trip plan that includes or dictates increased tractive efforts for that segment of the trip to be provided by the propulsion subsystem 460 of the vehicle system 400. In an embodiment, the control module 442 includes a software application or system such as the Trip Optimizer™ system provided by General Electric Company. The control module 442 may directly control the propulsion system 460 and/or may provide prompts to an operator for control of the propulsion system 460. As discussed above, control activities planned by the trip planning control module 440 may be overridden by control activities called for by the automatic control module 430. Further, the trip planning control module 440 may modify the trip plan based on control activities called for by the automatic control module 430 (e.g., a speed on a later portion of the trip may be adjusted to account for an alteration to speed caused by the automatic control module 430).

The route determination module 480 may include a memory 482 including a database 484. In the depicted embodiment, the route determination module 480 is configured to compare position information obtained using the automatic input module 420 and route occupancy information obtained from wayside equipment. The route determination module 480 determines a particular track upon which the vehicle system 400 is traveling based upon the comparison. For example, the route determination module 480 may obtain location information describing or corresponding to a position along a route of the rail vehicle system 400 from the automatic input module 420, and identify a similar position as being occupied for a given track but not for any other tracks. The given track may then be identified as the track upon which the vehicle system 400 is traveling. Alternatively or additionally, velocity information and/or location information at different times may be utilized by the route determination module 480. The database 484 may include information, for example, regarding the location of wayside modules, range of track detection equipment associated with a given wayside module, landmarks and the position of landmarks relative to particular tracks, numbers of tracks within a given range, the disposition of tracks relative to each other (e.g., a sequential order of tracks along a given direction), or the like.

Figure 5:
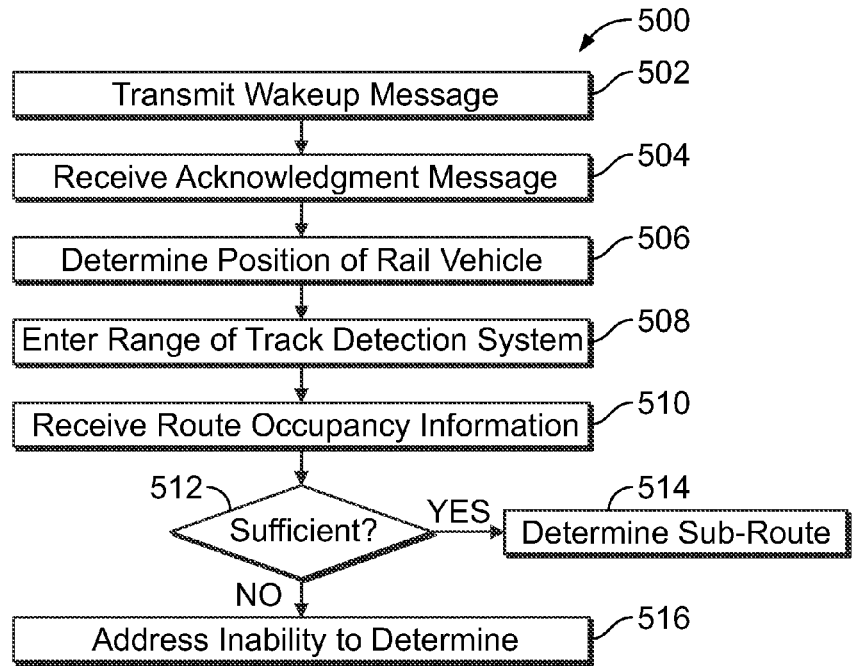
FIG. 5 is a flowchart of an embodiment for operating a rail vehicle approaching a wayside equipment module.

FIG. 5 is a flowchart of an embodiment of a method 500 for operating a rail vehicle. The method 500 may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion.

At 502, a wakeup message is sent from the rail vehicle to a wayside module or unit, such as, for example, a remote crossing module. In various embodiments, the rail vehicle may be traveling one of generally parallel sub-routes, such as tracks or lanes that form a route. For example, a route for a rail transportation network may include a number of generally parallel tracks extending alongside each other. In some embodiments, the network may be configured so that the rail vehicle may transfer from one sub-route to another sub-route at predetermined locations (e.g., switches) while still traveling in generally the same direction along generally the same path. The wakeup message is configured to activate a track detection system from a sleep mode. For example, as the rail vehicle approaches an effective range of the track detection system, the wakeup message may be sent to remove the track detection system from a power conserving sleep mode to an active mode. Thus, the wayside module may be prepared to communicate information regarding occupancy of any of the sub-routes as detected by the track detection system and/or to detect the occupancy of the rail vehicle on a given sub-route as the rail vehicle enters the range.

At 504, the rail vehicle receives an acknowledgement message. The acknowledgement message, for example, may confirm that the wakeup request has been successfully received and/or implemented. In various embodiments, the acknowledgment message may also include, for example, information describing the location of the wayside module, the type and/or range of the track detection system, information regarding any sub-routes already occupied, status information regarding operating condition of any sub-routes and/or associated equipment, or the like.

At 506, the position of the rail vehicle is determined onboard the rail vehicle (e.g., by a processing unit disposed onboard the rail vehicle using information obtained by a sensing or detection unit disposed onboard the rail vehicle). The rail vehicle may utilize one or more sensors or detectors located onboard the rail vehicle to determine the location and/or speed of the rail vehicle. In various embodiments, the rail vehicle may use one or more of a GPS, RFID, speedometer, axle tachometer, or trip planning information to determine a current or upcoming speed and/or location. Further, the position of the rail vehicle may be determined on a continuous or periodic basis as the rail vehicle traverses the sub-route toward the wayside module. The locations and/or speeds of the rail vehicle at various times may be tabulated and stored in a database of an onboard memory (e.g., for comparison with route occupancy information obtained by the rail vehicle from the wayside module).

At 508, the rail vehicle enters the range of the track detection system. Once the rail vehicle enters the range, the track detection system may begin detecting the presence of the rail vehicle within the range. For example, in some embodiments, the track detection system may be configured to utilize a measure, such as an RX parameter, that indicates the position (e.g., distance from a reference point such as a crossing or wayside module) of the rail vehicle. In other embodiments, the track detection system may be configured as an occupancy detection system that is used to determine whether or not a vehicle is present on a given track or sub-route within a predetermined range, but does not indicate position along the given track within the range. In various embodiments, information from the track detection system may be utilized to determine occupancy and/or position along each sub-route of the route periodically, generally continuously, or otherwise on an ongoing basis.

At 510, the rail vehicle receives route occupancy information from the wayside module. The route occupancy information corresponds to a presence or absence of vehicular traffic on each sub-route within a range of a route detection system as detected by the track detection system. The wayside module may receive the information from the track detection system, process and/or format the information to produce a message including the route occupancy information, and transmit the message to the rail vehicle. For example, the wayside module may transmit a message that describes the occupancy of the sub-routes in a predetermined order. The route occupancy information for each sub-route may describe, depict, or correspond to one or more of an indication of whether a vehicle is present or not on the sub-route, a position along the sub-route of a vehicle, a speed of the vehicle on the sub-route, or a time to which the route occupancy information corresponds.

At 512, it is determined if the route occupancy information received at 510 is sufficient for the determination or identification of the particular track or sub-route on which the rail vehicle is traveling. Generally, the rail vehicle may determine which sub-route the rail vehicle is traveling upon based on a comparison of the route occupancy information from the wayside module with the position information obtained by the rail vehicle. For example, if the occupancy (e.g., one or more of a presence of a vehicle within the range, location of the vehicle, velocity of the vehicle) as indicated by the route occupancy information for one particular sub-route matches the position as determined by the rail vehicle within a predetermined margin of error, then the particular sub-route may be identified as the sub-route upon which the rail vehicle is disposed. However, if the occupancy information for no sub-route is within the margin of error, or if the occupancy information for more than one sub-route is within the margin of error, than additional information may be required. If the sub-route on which the rail vehicle is traveling is not able to be determined, the method 500 proceeds to 516. If the sub-route on which the rail vehicle is traveling is able to be determined, the method 500 proceeds to 514.

At 514, the sub-route on which the rail vehicle is traveling is determined or identified. In various embodiments, the position information obtained using one or more detection units disposed onboard the rail vehicle is compared with the occupancy information describing the occupancy of each sub-route, with the sub-route having the most similar information to the position determined by the rail vehicle identified as the sub-route on which the rail vehicle is disposed. For example, in an embodiment using a track occupancy detection system, if the rail vehicle determines using the position information that the rail vehicle is within range of a track occupancy detection system, and if the route occupancy information obtained by the rail vehicle from the wayside module indicates only one sub-route is occupied, then the occupied sub-route may be identified as the sub-route on which the rail vehicle is disposed or traveling. In various embodiments, additional precision may be achieved by analyzing, for example, the time at which the position information indicates the rail vehicle enters the range along with timing information corresponding to when one or more sub-routes became occupied as indicated by the route occupancy information determined using information from the track detection system. As another example, in an embodiment using a crossing predictor system, a match between the position information and a particular sub-route may be determined using one or more of location, velocity, or direction of travel. In some alternate embodiments, the rail vehicle may transmit position information as determined by the rail vehicle to the wayside module, the wayside module may compare the position information from the rail vehicle with route occupancy information obtained using a track detection system and, based, on the comparison, the wayside module may determine the particular sub-route on which the vehicle system is traveling. The wayside module may then transmit the identification of the particular sub-route to the rail vehicle. After the particular sub-route on which the rail vehicle is traveling, the identified sub-route may be stored, for example in a memory accessible to control system such as a PTC system. The stored track identification may be used in conjunction with control of the train and/or use with the PTC system. As the rail vehicle progresses along a trip or mission, the track identification may be adjusted or modified as appropriate, for example if the rail vehicle travels over a switch and transfers to a different track. In various embodiments, the method 500 may be performed to initially determine a track or sub-route identification when the track is unknown, and/or to confirm a current identified track or sub-route. For example, if, later during a trip or mission, the rail vehicle approaches a subsequent wayside module associated with a track detection system, the method 500 may be performed again, for example, to confirm that a current track identification is correct, or, as another example, to determine a track identification if a previous track identification has been lost (e.g., at a cut-out from PTC covered territory).

At 516, the inability to determine the particular sub-route or track on which the rail vehicle is disposed or traveling is addressed. One or more of a variety of techniques may be employed to address the inability to determine the sub-route. In some embodiments, additional steps may be taken to identify or determine the sub-route. For example, in various embodiments, the rail vehicle may request additional information from the wayside module, such as route occupancy information for additional and/or subsequent times. Alternatively or additionally, the operation of the rail vehicle may be altered to help distinguish the occupancy information corresponding to the rail vehicle from occupancy information corresponding to a different vehicle on a different sub-route with the range of the track detection system. For example, the speed of the rail vehicle may be increased or decreased. As another example, the rail vehicle may be brought to a stop, or, as one more example, the rail vehicle may be started in motion if both the rail vehicle and another vehicle with the range are stationary at a given time. The control of the rail vehicle may be adjusted automatically or autonomously without operator intervention, or may be adjusted via an operator input (e.g., following a prompt provided to the operator requesting or ordering adjustment of the control of the rail vehicle). Further, in various embodiments, an operator may provide input to help identify a particular track or sub-route on which the rail vehicle is traveling, for example in response to a prompt. In various embodiments, if the rail vehicle is unable to autonomously determine the sub-route on which the rail vehicle is disposed due to the presence of another rail vehicle, an operator may be prompted to enter a description of one or more of a landmark, a track identifier such as a sign or label, the position of the vehicles relative to each other, or the like.

Figure 6:
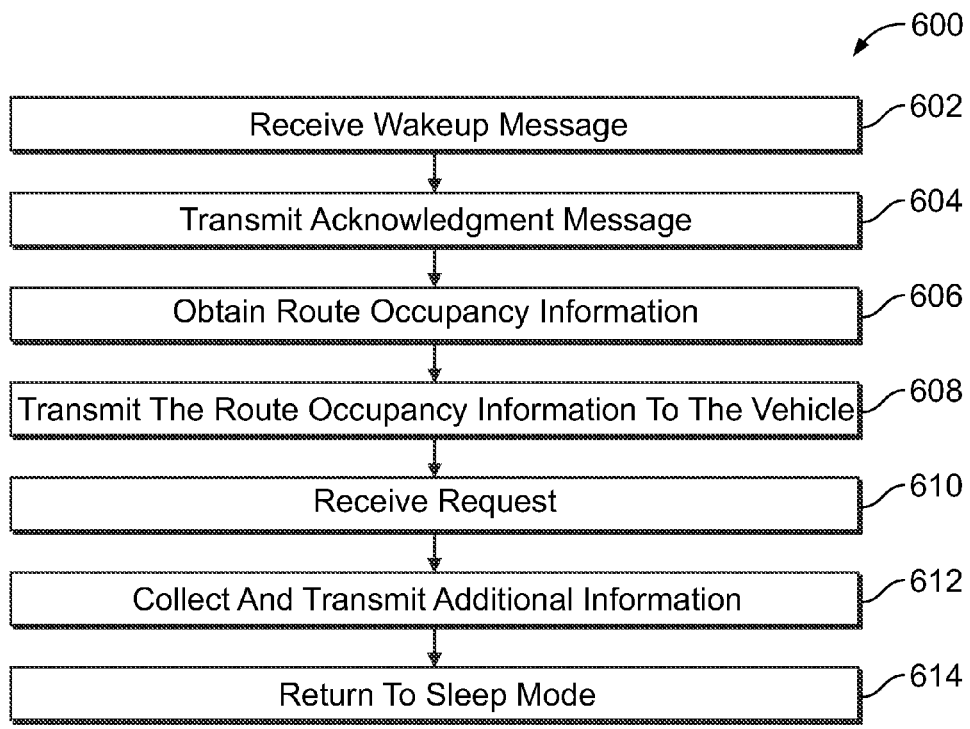
FIG. 6 is a flowchart of an embodiment for operating a wayside equipment system.

FIG. 6 is a flowchart of an embodiment of a method 600 for operating a wayside equipment module or unit. The method 600 may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion.

At 602, a wakeup message is received by the wayside module from a vehicle such as a rail vehicle. In various embodiments, the wayside module or unit may be configured as a remote crossing module. In various embodiments, the rail vehicle may be traveling one of generally parallel sub-routes, such as tracks or lanes that form a route, with the wayside module disposed along the route, for example proximate a crossing. The wayside module in various embodiments is operably coupled to and receives information from a track detection system (e.g., crossing predictor system, track occupancy detection system, or the like). A route for a rail transportation network may include a number of generally parallel tracks extending alongside each other. The wakeup message is configured to activate a track detection system from a sleep mode. For example, the wayside module may, responsive to receipt of the wakeup message, remove the track detection system from a power conserving sleep mode to an active mode.

At 604, the wayside module transmits an acknowledgement message to the rail vehicle. The acknowledgement message, for example, may confirm that the wakeup request has been successfully received and/or implemented. In various embodiments, the acknowledgment message may also include, for example, information describing the location of the wayside module, the type and/or range of the track detection system, information regarding any sub-routes already occupied, status information regarding operating condition of any sub-routes and/or associated equipment, or the like.

At 606, the wayside module obtains route occupancy information from the track detection system. In various embodiments, the route occupancy information corresponds to a presence or absence of vehicular traffic on each sub-route within a range as detected by the track detection system. The route occupancy information for each sub-route may describe, depict, or correspond to one or more of an indication of whether a vehicle is present or not on the sub-route, a position along the sub-route of a vehicle, a speed of the vehicle on the sub-route, or a time to which the route occupancy information corresponds. For example, in various embodiments utilizing a crossing predictor system, the route occupancy information may include a location of any vehicles located on any of the routes (and/or an RX parameter for each sub-route indicating such locations) as well as a time stamp or other chronological identifier that identifies a time when the occupancy information was collected. Thus, the route occupancy information may include location information acquired at different times tabulated with the times at which the information was collected. Thus, in various embodiments, a velocity and/or direction of travel of one or more vehicles may be determined using a change in occupancy information for each sub-route over time.

At 608, the route occupancy information is transmitted from the wayside module to the rail vehicle. The wayside module may receive the information from the track detection system, process and/or format the information to produce a message including the route occupancy information, and transmit the message to the rail vehicle. For example, the wayside module (e.g., a communication module of the wayside module) may organize the information obtained from the track detection system into a predetermined format with information corresponding to particular sub-routes listed or arranged in a particular order recognized by the rail vehicle. Thus, the rail vehicle may utilize the transmitted message to identify a particular sub-route having occupancy information most closely corresponding with information independently obtained by the rail vehicle that corresponds to the location and/or movement (e.g., speed and/or direction of travel) of the rail vehicle.

At 610 in the depicted embodiment, the wayside module receives a request for additional information from the rail vehicle. For example, the rail vehicle may not have been able to determine the particular sub-route on which the rail vehicle is disposed with the information initially provided at 608. In alternate embodiments, the wayside module may continue sending route occupancy information for subsequent times periodically without receiving a request. In some embodiments, the wayside module may transmit route occupancy information periodically (e.g., at predetermined intervals) until the wayside module receives a message from the rail vehicle indicating that a track or sub-route determination has successfully been made and additional information is no longer required.

At 612, additional information is collected responsive to the request received at 610, and is transmitted to the rail vehicle.

At 614, the wayside module returns the track detection system to a sleep mode. For example, after the track or sub-route has been successfully identified and/or any crossings associated with the track detection system have been operated as appropriate, the track detection system may be returned to a sleep mode to conserve energy. In various embodiments, for example, the track detection system may be configured to send a signal through tracks. In the sleep mode, the track detection system may not send the signal through the tracks. If another subsequent rail vehicle (approaches the range of the track detection system, the wayside module may receive a wakeup message and the method 600 repeated and/or a crossing operated as the subsequent rail vehicle approaches and enters the range.

In an embodiment, a system includes a communication module and a determination module. The communication module is configured to be located onboard a first vehicle that is configured to travel along a route. The route includes plural sub-routes that extend generally parallel to each other. The communication module is configured to receive route occupancy information from an off-board wayside module disposed along the route. The route occupancy information corresponds to a presence or absence of vehicular traffic on each of the sub-routes within a geographic range of a route detection system that is configured to be operably coupled to the wayside module. The determination module is configured to be located onboard the first vehicle, and to obtain position information from one or more onboard detection units disposed onboard the vehicle. The determination module is configured to determine a particular sub-route of the plural sub-routes on which the first vehicle is disposed using a comparison of the position information obtained from the one or more onboard detection units with the occupancy information received from the off-board wayside module.

In another aspect, the occupancy information may include occupancy location information and occupancy velocity information. The occupancy location information corresponds to a location of one or more occupying vehicles traveling on the route, and the occupancy velocity information corresponds to a velocity of one or more occupying vehicles traveling on the route. In various embodiments, the occupancy velocity information may include direction information corresponding to a direction of travel (e.g., a direction of travel relative to a wayside module and/or crossing). The one or more occupying vehicles are disposed on the route within the geographic range of the route detection system. The position information includes vehicle location information and vehicle velocity information. The vehicle location information corresponds to a location of the first vehicle determined using the one or more onboard detection units, and the vehicle velocity information corresponds to a velocity of the first vehicle determined using the one or more onboard detection units.

In another aspect, the determination module may be configured to direct an operator of the first vehicle to change velocity of the first vehicle if the determination module is not able to distinguish between sub-route occupancy information obtained from the wayside module corresponding to two or more of the sub-routes. In another aspect, the system may include an automatic control module configured to autonomously alter velocity of the first vehicle responsive to the determination module being unable to distinguish between sub-route occupancy information corresponding to two or more of the sub-routes.

In another aspect, the first vehicle may be a rail vehicle, and each sub-route is configured as a pair of tracks configured for the travel thereon of the first rail vehicle. Further, the occupancy information is provided by a track detection system operably coupled to the sub-routes. In some embodiments, the track detection system is configured as a crossing predictor system. For example, the occupancy information may include information (e.g., RX parameter information) representing a percentage of unoccupied track between the wayside module and a termination shunt of the crossing predictor system.

In another aspect, the system may include an automatic control module configured to be disposed onboard the first vehicle and to automatically control movement of the first vehicle. The automatic control module is operably coupled with the communication module.

In an embodiment, a system includes a wayside module configured to be disposed along a route along which a first vehicle is configured to travel. The route includes plural sub-routes, and the wayside module includes an occupancy identification module and a communication module. The occupancy identification module is configured to be operably coupled to a route detection system, and to obtain occupancy information corresponding to a presence or absence of vehicular traffic on each of the sub-routes within a geographic range of the route detection system. The occupancy information includes vehicle occupancy information representative of the presence or absence of the first vehicle on one of the sub-routes. The communication module is configured to communicatively couple the wayside module to the first vehicle, and to transmit the occupancy information to the first vehicle.

In another aspect, the occupancy information includes occupancy location information and occupancy velocity information. The occupancy location information corresponds to a location of one or more occupying vehicles traveling on the route, and the occupancy velocity information corresponds to a velocity of the one or more occupying vehicles traveling on the route. In various embodiments, the occupancy velocity information may include direction information corresponding to a direction of travel (e.g., a direction of travel relative to a wayside module and/or crossing). The one or more occupying vehicles are disposed on the route within the geographic range of the route detection system.

In another aspect, the first vehicle is a rail vehicle, each sub-route is configured as a track configured for the travel thereon of the rail vehicle, and the route detection system is configured as a track detection system operably coupled to the sub-routes. In various embodiments, the track detection system is configured as a crossing predictor system, and the occupancy information includes information corresponding to a percentage of unoccupied track between the wayside module and a termination shunt of the crossing predictor system.

In another aspect, the wayside module is configured as a remote crossing module configured to activate a crossing warning system using the occupancy information.

An embodiment relates to a method that includes obtaining, at a determination module disposed onboard a first vehicle, position information corresponding to a location of the first vehicle from one or more detection units disposed onboard the first vehicle. The first vehicle is configured to travel along a route, with the route including plural sub-routes. The method also includes obtaining, via a communication module disposed onboard the first vehicle, route occupancy information from a wayside module disposed along the route. The route occupancy information corresponds to a presence or absence of vehicular traffic on each of the sub-routes within a geographic range of a route detection system configured to be operably coupled to the wayside module. The method further includes determining, onboard the first vehicle, a particular sub-route of the plural sub-routes on which the first vehicle is disposed using a comparison of the position information and the route occupancy information.

In an embodiment of the method, the route occupancy information includes occupancy location information and occupancy velocity information. The occupancy location information corresponds to a location of one or more occupying vehicles traveling on the route, and the occupancy velocity information corresponds to a velocity of one or more occupying vehicles traveling on the route. In various embodiments, the occupancy velocity information may include direction information corresponding to a direction of travel (e.g., a direction of travel relative to a wayside module and/or crossing). The one or more occupying vehicles are disposed on the route within the range of the route detection system. Further, the position information includes vehicle location information and vehicle velocity information. The vehicle location information corresponds to a location of the first vehicle determined using the one or more detection units disposed onboard the first vehicle, and the vehicle velocity information corresponds to a velocity of the first vehicle determined using the one or more detection units disposed onboard the first vehicle.

In an embodiment of the method, the method includes directing a change of velocity of the first vehicle if sub-route occupancy information corresponding to two or more of the sub-routes is sufficiently similar to prevent determining which of the sub-routes the first vehicle is disposed on. For example, a prompt may be provided directing an operator to change velocity. As another example, a direction or command may be provided to an automatic control system for changing velocity.

In various embodiments, the first vehicle may be a rail vehicle, each sub-route may be configured as a track configured for the travel thereon of the rail vehicle, and the occupancy information may be provided by a track detection system operably coupled to the sub-routes. For example, the track detection system may be configured as a crossing predictor system. In various embodiments, the route occupancy information includes information representing a percentage of unoccupied track between the wayside module and a termination shunt of the crossing predictor system.

In an embodiment of the method, the method includes transmitting a wake-up message to the wayside module from the first vehicle as the first vehicle approaches the range of the route detection system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
a communication module configured to be located onboard a first vehicle that is configured to travel along a route, the route comprising plural sub-routes, the communication module configured to receive route occupancy information from an off-board wayside module disposed along the route, the route occupancy information corresponding to a presence or absence of vehicular traffic on each of the sub-routes within a geographic range of a route detection system configured to be operably coupled to the wayside module; and
a determination module configured to be located onboard the first vehicle, the determination module configured to obtain position information from one or more onboard detection units disposed onboard the first vehicle, the one or more onboard detection units comprising at least one detector configured to detect a position of the first vehicle, the determination module configured to determine a particular sub-route of the plural sub-routes on which the first vehicle is disposed using a comparison of the position information obtained from the one or more onboard detection units with the route occupancy information received from the off-board wayside module.

2. The system of claim 1, wherein the route occupancy information comprises occupancy location information and occupancy velocity information, the occupancy location information corresponding to a location of one or more occupying vehicles traveling on the route, the occupancy velocity information corresponding to a velocity of the one or more occupying vehicles traveling on the route, the one or more occupying vehicles being disposed on the route within the geographic range of the route detection system, and wherein the position information comprises vehicle location information and vehicle velocity information, the vehicle location information corresponding to a location of the first vehicle determined using the one or more onboard detection units, the vehicle velocity information corresponding to a velocity of the first vehicle determined using the one or more onboard detection units.

3. The system of claim 1, wherein the first vehicle is a rail vehicle, each of the sub-routes is configured as a track configured for the travel thereon of the first rail vehicle, and the route occupancy information is provided by a track detection system operably coupled to the sub-routes.

4. The system of claim 3, wherein the track detection system is configured as a crossing predictor system.

5. The system of claim 4, wherein the route occupancy information comprises information representing to a percentage of unoccupied track between the wayside module and a termination shunt of the crossing predictor system.

6. The system of claim 1, further comprising an automatic control module configured to be disposed onboard the first vehicle and to automatically control movement of the first vehicle, the automatic control module operably coupled with the communication module.

7. A system comprising:
a wayside module, the wayside module configured to be disposed along a route along which a first vehicle is configured to travel, the route comprising plural sub-routes, the wayside module comprising:

an occupancy identification module configured to be operably coupled to a route detection system, the occupancy identification module configured to obtain occupancy information corresponding to a presence or absence of vehicular traffic on each of the sub-routes within a geographic range of the route detection system, the occupancy information including vehicle occupancy information representative of the presence or absence of the first vehicle on one of the sub-routes; and a communication module configured to communicatively couple the wayside module to the first vehicle, the communication module configured to transmit the occupancy information to the first vehicle.

8. The system of claim 7, wherein the occupancy information comprises occupancy location information and occupancy velocity information, the occupancy location information corresponding to a location of one or more occupying vehicles traveling on the route, the occupancy velocity information corresponding to a velocity of the one or more occupying vehicles traveling on the route, the one or more occupying vehicles being disposed on the route within the geographic range of the route detection system.

9. The system of claim 7, wherein the first vehicle is a rail vehicle, each sub-route is configured as a track configured for the travel thereon of the rail vehicle, and the route detection system is configured as a track detection system operably coupled to the sub-routes.

10. The system of claim 9, wherein the track detection system is configured as a crossing predictor system, and wherein the occupancy information includes information representing a percentage of unoccupied track between the wayside module and a termination shunt of the crossing predictor system.

11. The system of claim 7, wherein the wayside module is configured as a remote crossing module configured to activate a crossing warning system using the occupancy information.

12. A method comprising:

obtaining, at a determination module disposed onboard a first vehicle, position information corresponding to a location of the first vehicle from one or more detection units disposed onboard the first vehicle, the one or more onboard detection units comprising at least one detector configured to detect a position of the first vehicle, wherein the first vehicle is configured to travel along a route, the route comprising plural sub-routes;

obtaining, via a communication module disposed onboard the first vehicle, route occupancy information from a wayside module disposed along the route, the route occupancy information corresponding to a presence or absence of vehicular traffic on each of the sub-routes within a geographic range of a route detection system configured to be operably coupled to the wayside module; and determining, onboard the first vehicle, a particular sub-route of the plural sub-routes on which the first vehicle is disposed using a comparison of the position information with the route occupancy information.

13. The method of claim 12, wherein the route occupancy information comprises occupancy location information and occupancy velocity information, the occupancy location information corresponding to a location of one or more occupying vehicles traveling on the route, the occupancy velocity information corresponding to a velocity of the one or more occupying vehicles traveling on the route, the one or more occupying vehicles being disposed on the route within the range of the route detection system, and wherein the position information comprises vehicle location information and vehicle velocity information, the vehicle location information corresponding to a location of the first vehicle determined using the one or more detection units, the vehicle velocity information corresponding to a velocity of the first vehicle determined using the one or more detection units.

14. The method of claim 12, wherein the first vehicle is a rail vehicle, each sub-route is configured as a track configured for the travel thereon of the rail vehicle, and the occupancy information is provided by a track detection system operably coupled to the sub-routes.

15. The method of claim 14, wherein the track detection system is configured as a crossing predictor system.

16. The method of claim 15, wherein the route occupancy information includes information representing a percentage of unoccupied track between the wayside module and a termination shunt of the crossing predictor system.

17. The method of claim 12, further comprising transmitting a wake-up message to the wayside module from the first vehicle as the first vehicle approaches the range of the route detection system.

18. A system comprising:

a communication module configured to be located onboard a first vehicle that is configured to travel along a route, the route comprising plural sub-routes, the communication module configured to receive route occupancy information from an off-board wayside module disposed along the route, the route occupancy information corresponding to a presence or absence of vehicular traffic on each of the sub-routes within a geographic range of a route detection system configured to be operably coupled to the wayside module; and a determination module configured to be located onboard the first vehicle, the determination module configured to obtain position information from one or more onboard detection units disposed onboard the first vehicle, the determination module configured to determine a particular sub-route of the plural sub-routes on which the first vehicle is disposed using a comparison of the position information obtained from the one or more onboard detection units with the route occupancy information received from the off-board wayside module, wherein the determination module is configured to direct an operator of the first vehicle to change velocity of the first vehicle if the determination module is not able to distinguish between sub-route occupancy information corresponding to two or more of the sub-routes.

19. A system comprising:

a communication module configured to be located onboard a first vehicle that is configured to travel along a route, the route comprising plural sub-routes, the communication module configured to receive route occupancy information from an off-board wayside module disposed along the route, the route occupancy information corresponding to a presence or absence of vehicular traffic on each of the sub-routes within a geographic range of a route detection system configured to be operably coupled to the wayside module;

a determination module configured to be located onboard the first vehicle, the determination module configured to obtain position information from one or more onboard detection units disposed onboard the first vehicle, the determination module configured to determine a particular sub-route of the plural sub-routes on which the first vehicle is disposed using a comparison of the position information obtained from the one or more onboard detection units with the route occupancy information received from the off-board wayside module; and an automatic control module configured to autonomously alter velocity of the first vehicle responsive to the determination module being unable to distinguish between sub-route occupancy information corresponding to two or more of the sub-routes.

20. A method comprising:

obtaining, at a determination module disposed onboard a first vehicle, position information corresponding to a location of the first vehicle from one or more detection units disposed onboard the first vehicle, wherein the first vehicle is configured to travel along a route, the route comprising plural sub-routes;

obtaining, via a communication module disposed onboard the first vehicle, route occupancy information from a wayside module disposed along the route, the route occupancy information corresponding to a presence or absence of vehicular traffic on each of the sub-routes within a geographic range of a route detection system configured to be operably coupled to the wayside module;

determining, onboard the first vehicle, a particular sub-route of the plural sub-routes on which the first vehicle is disposed using a comparison of the position information with the route occupancy information; and directing a change of velocity of the first vehicle if sub-route occupancy information corresponding to two or more of the sub-routes is sufficiently similar to prevent determining which of the sub-routes the first vehicle is disposed on.

\* \* \* \* \*